H. W. NEUDECK.
ROAD SURFACING MACHINE.
APPLICATION FILED MAY 22, 1920.
1,412,193.
Patented Apr. 11, 1922.
2 SHEETS—SHEET 2.
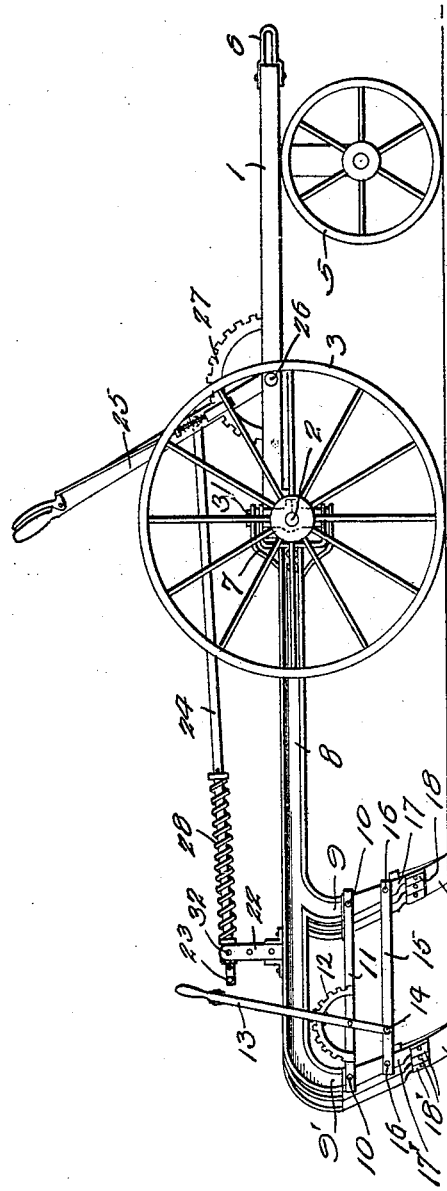
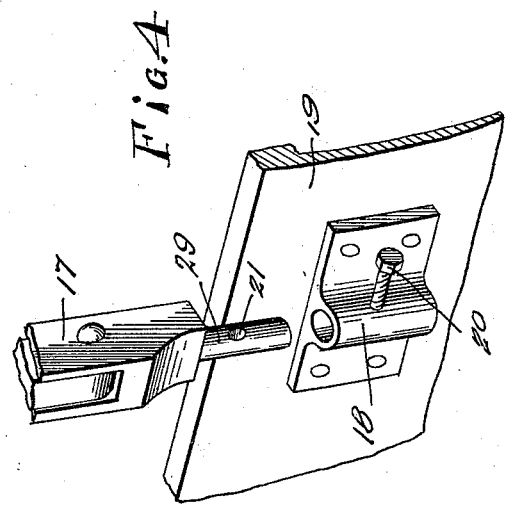
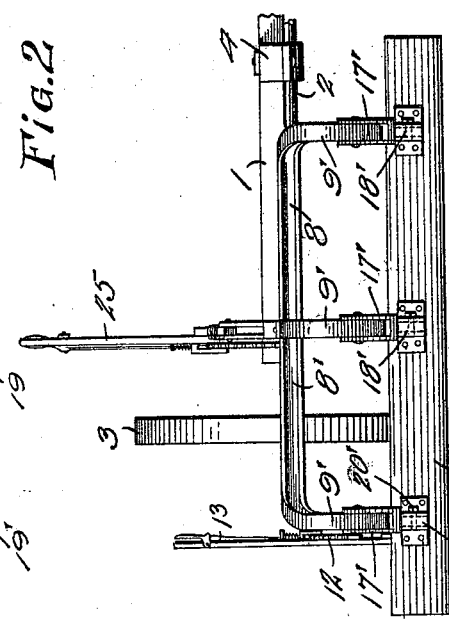
Inventor
Harry W. Neudeck

UNITED STATES PATENT OFFICE.

HARRY W. NEUDECK, OF FORT DODGE, IOWA.

ROAD-SURFACING MACHINE.

1,412,193.  Specification of Letters Patent.  Patented Apr. 11, 1922.

Application filed May 22, 1920. Serial No. 383,485.

*To all whom it may concern:*

Be it known that I, HARRY W. NEUDECK, a citizen of the United States, residing at Fort Dodge, in the county of Webster and State of Iowa, have invented a new and useful Road-Surfacing Machine, of which the following is a specification.

The object of my invention is to provide a novel road surfacing machine having a plurality of dragboards; to provide novel means for adjusting and mounting same, and to provide improved means for attaching the device to a vehicle. It is a further object of my invention to provide the novel combination and arrangement of parts set forth in the following description and claim and in the accompanying drawings, in which—

Fig. 2 is a side elevation;

Fig. 3 is a detail rear elevational view of part of the machine; and

Fig. 4 is a detail perspective view of the means employed for mounting the drag boards 19.

Like numerals designate like parts in each of the several views.

Figure 1:
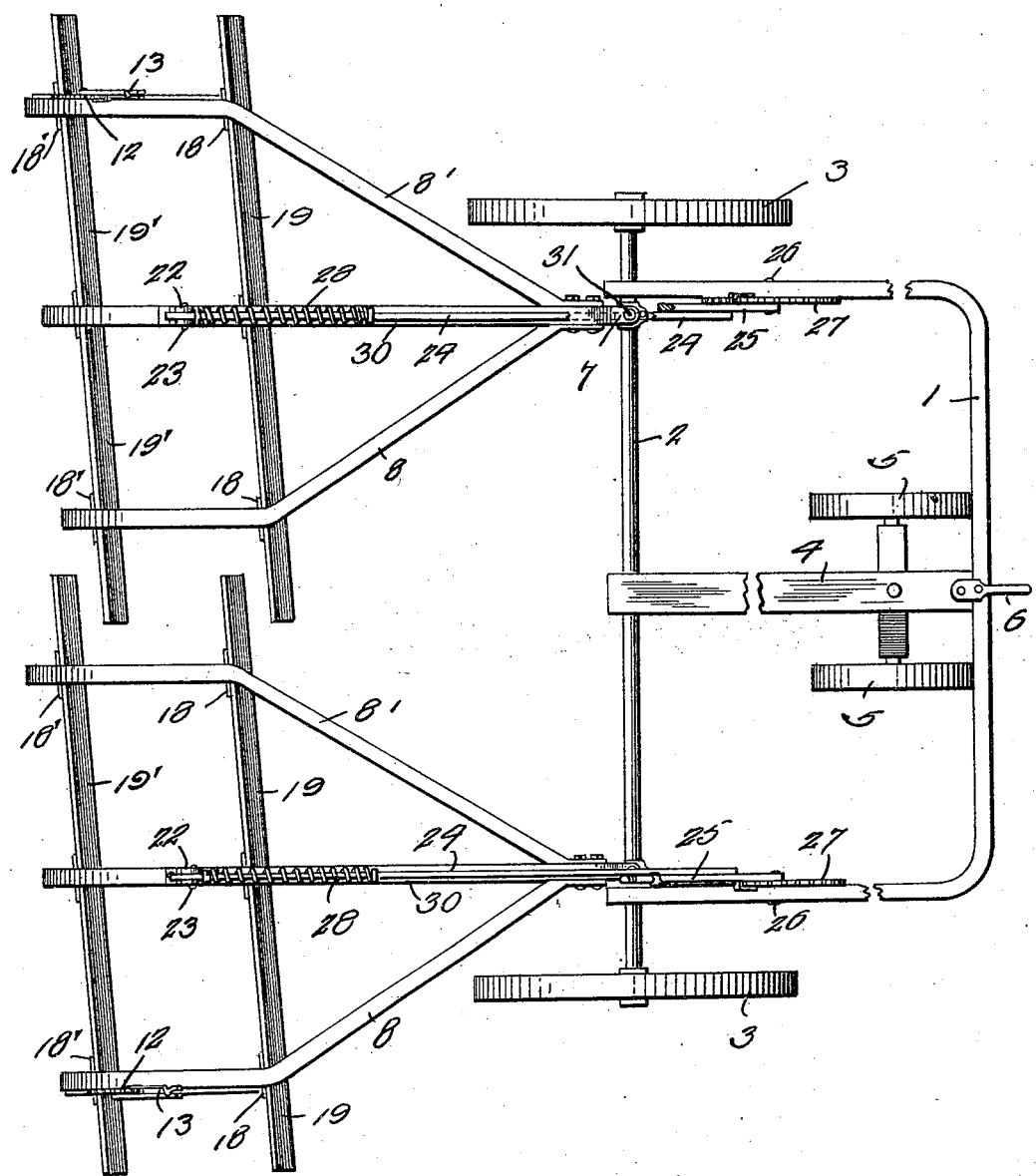
Figure 1 is a top plan of the invention.

Referring to the accompanying drawings, I provide spaced dragboards or blades 19 and 19', of which there are two sets. Attached to the rear of each of these members 19 and 19' are collars or socket plates 18, adapted to receive the ends 29 of members 17 and 17', which latter members in turn are pivotally attached to the downwardly turned claws 9 and 9' of frame members 8 and 8' and beam 30 which together constitute the frame work to which the surfacing blades are attached. As illustrated in Fig. 1, the frame members 8 are somewhat shorter than the frame members 8', and the blades 19 and 19' are accordingly disposed in slanting arrangement relative to the line of travel of the machine, with the ends of one set of blades overlapping the ends of the other set, as shown. Beams 30 are provided with swivel connections 7 at their forward ends, to receive a pin 31 by which the device may be attached to the drawbar of a tractor, or to a suitable wheeled frame.

To permit of adjusting blades 19 and 19', I provide a suitable hand lever 13, operatively connected with segment 12 mounted on a segment beam 11 which is suitably mounted on the outer claws 9 and 9', as shown in Fig. 2 by pivots 10, which connect members 17 and 17' with claws 9 and 9', respectively. The lower end of lever 13 is pivotally attached at 14 to the movable beam 15, which is swung forward or backward to regulate the position of blades 19 and 19' by the operation of the lever 13, which is a hand operated lever of conventional type, having a spring and plunger engaging the segment 12 and adapted to be disengaged therefrom to swing the lever.

To raise and lower the blades for the desired depth of cut, I provide a suitable lug 22 on beam 30, to which is adjustably attached one end of rod 24 by a suitable swivel member 32, the other end of rod 24 being attached to a suitable lever 25 operatively connected with segment 27, both members 25 and 27 being suitably mounted on the frame of the tractor or other vehicle to which the machine is attached. I provide a spring 28, attached to rod 24 as shown or abutting against collars on rod 24. Adjustably mounted in the end of rod 24 is a suitable bolt 23 which abuts against lug 22 as rod 24 is drawn forward by lever 25, thus raising the frame to which the blades of the machine are attached. In operating the device in the reverse direction the rod 24 slides back through swivel member 32 in which it is slidably mounted and the spring 28 is compressed.

It is within the contemplation of my invention to attach the foregoing mechanism either to a tractor or to such a wheel frame as is illustrated in Figs. 1 and 2, comprising the U shaped frame 1 attached to axle 2 on which are mounted wheels 3, and having a small truck 5 mounted on beam 4 as illustrated in Fig. 1. I provide a suitable clevis or hook 6 by which the frame is attached to a team.

In operation the earth taken up by one set of plates 19 and 19' is gradually moved over onto the other overlapping set of like plates and thus worked toward the middle of the road. The blades may be adjusted to the most desirable position for surfacing the road by operating levers 13 and 15 to control the angle and the height, respectively, of the surfacing plates as above described. The main beams are so mounted as to have flexibility both up and down and sideways; and may be attached to the wheeled frame illustrated, or to a shaft which in turn is attached to the draw bar of a tractor.

What I claim is:

In a road surfacing machine, the combination of spaced and parallel sets of slantingly positioned road surfacing plates having the adjacent ends of said plates positioned in spaced overlapping relation, frames on the said plates on which said plates are mounted, said frames being pivotally attached to the body of the road surfacing machine, means for adjustably controlling the angle of the road surfacing plates relative to the frame of the machine, and means for raising and lowering the plates vertically independent of the angle at which they are operated.

HARRY W. NEUDECK.